Patented Oct. 20, 1953

2,656,281

UNITED STATES PATENT OFFICE 2,656,281

MOLDABLE COMPOUNDS FOR MAKING JIGS

Rene D. Wasserman, Stamford, Conn.

No Drawing. Application September 9, 1950,
Serial No. 184,119

3 Claims. (Cl. 106—84)

This invention has to do with moldable compounds which can be used to hold objects together temporarily while they are being machined, adjusted, painted, united, or otherwise treated.

Heretofore, when it has been desired to hold two or more component parts together temporarily, it has been necessary to construct a wooden or metallic jig. This has generally been a time consuming and expensive procedure. It has also been subject to other drawbacks in that the jig sometimes marred the work or failed to protect it adequately against damage by heat or chemicals.

The primary object of the invention is to obviate the need for a jig by providing a moldable quick setting compound which will hold the objects together strongly.

It is desirable that such a compound shall be undamaged by heat and shall have a low coefficient of thermal expansion in order that the objects may, if desired, be subjected to operations involving the application of heat while being securely held together. It is a feature of the invention that the novel compound has these properties.

It is a further feature that the compound does not damage nor adhere tenaciously to the component surfaces, and that when dry and set it can be easily removed without damaging the surfaces of the objects.

It is a further feature that the compound will retain its properties indefinitely and be easy to handle.

It is a further feature that the compound protects the components against damage by heat or chemicals, preventing blistering or discoloring.

It is still another feature that the compound can be easily diluted with water and applied in a thin film to form a coating on objects to protect them from damage by heat or chemicals.

To the above ends the novel compound is desirably made to include a binder, a neutral low shrinkage, low expansion coefficient material of a mineral nature, an emulsifier, a wetting agent and, optionally, one or more metallic oxides.

A typical example of the compound which has given good results comprises the ingredients set forth below in the proportions indicated.

| | Grams |
|---|---|
| Refractory materials | 40 |
| Sodium silicate | 20 |
| Sodium carbonate | 10 |
| Glycerine | 5 |
| Ferric oxide | 5 |
| Water in sufficient quantity to keep the compound soft and workable. | |

Within the scope of the invention the above formula may be varied widely to include in addition to water:

40–88% refractory materials
30 to 3% binder silicate
14 to 3% emulsifier
20 to 6% alkali carbonate
15–0% metallic oxide
6 to 0% wetting agent For the purpose of the present specification and claims the following definitions apply:

"Refractory materials" include any one of, asbestos, fire-proof clay, chamotte, sillimanite, chromium oxide, carborundum and their equivalents, as well as any combination of two or more of them.

The asbestos, if used, is desirably of special fiber length to insure a clean surface when removed. The best length is from one-half to one-fifth inch.

"Binder silicate" includes any one of the alkali or alkali earth silicates, and their equivalents, as well as any combination of two or more of them. As the name implies, the silicate serves to bind together the ingredients of the composition. It is provided in powder or liquid form.

"Emulsifier" includes glycerine, gelatine, glycol and their equivalents, as well as any combination of two or more of them. The emulsifier is designed to keep the composition soft and plastic in a cool state.

It also serves to limit the amount of water employed, thereby making the mold less subject to disintegration when exposed to heat.

"Alkali carbonate" includes the carbonate of any alkali metal or its equivalent, as well as any combination of two or more of them. The purpose of the carbonate is to control the co-efficient of expansion of the compound and to secure good adhesion of articles, particularly at high temperatures.

"Metallic oxide" includes ferric oxide and its equivalents. The oxides, like the carbonates, affect the co-efficient of expansion. A primary purpose of the oxides, however, is to increase the hardness and strength of the set compound when this is desired.

"Wetting agent" includes any commercial detergent.

The incorporation of a wetting agent helps the compound to adhere readily to objects, and enables it to be spread thinly if that is required.

I have described what I believe to be the best embodiments of my invention. I do not wish, however, to be confined to the embodiments described, but what I desire to cover by Letters Patent is set forth in the appended claims.

I claim:
1. A moldable quick setting compound consisting of the following ingredients in substantially the proportions indicated: asbestos—50%; sodium silicate—25%; sodium carbonate—12.5%; glycerine—6.25%; and ferric oxide—6.25%.
2. A moldable quick setting compound adapted to serve as a temporary jig and consisting essentially of asbestos—40 to 88%; binder silicate—3 to 30%; alkali carbonate—6 to 20%; and metallic oxide, up to 15%.
3. A moldable quick setting compound adapted to serve as a temporary jig and consisting essentially of 40 to 88% asbestos having most of its fibers within a range of one-half to one-fifth inch in length, binder silicate—3 to 30%; glycerine—3 to 14%; and alkali carbonate—6 to 20%.

RENE D. WASSERMAN.

References Cited in the file of this patent

UNITED STATES PATENTS

| Number | Name | Date |
| --- | --- | --- |
| 403,267 | Heimann | May 14, 1889 |
| 671,548 | Gordon | Apr. 9, 1901 |
| 893,923 | Hinzke | July 21, 1908 |
| 1,470,674 | Amies | Oct. 16, 1923 |
| 2,287,411 | Boller et al. | June 23, 1942 |
| 2,329,014 | Taylor | Sept. 7, 1943 |
| 2,368,322 | Passelecq | Jan. 30, 1945 |
| 2,429,957 | Cagnina | Oct. 28, 1947 |
| 2,456,643 | Napier | Dec. 21, 1948 |
| 2,460,878 | Battista et al. | Feb. 9, 1949 |
| 2,522,707 | Faber | Sept. 19, 1950 |